United States Patent [19]

Andersson

[11] Patent Number: 4,964,611
[45] Date of Patent: Oct. 23, 1990

[54] VALVE FOR PRESSURIZED MEDIA

[75] Inventor: Bo Andersson, Skellefteå, Sweden

[73] Assignee: Bahco Hydrauto AB, Skelleftea, Sweden

[21] Appl. No.: 435,704

[22] Filed: Nov. 14, 1989

[30] Foreign Application Priority Data

Nov. 15, 1988 [SE] Sweden .................... 8804116

[51] Int. Cl.$^5$ ............................ F16K 31/12
[52] U.S. Cl. ................... 251/30.02; 251/44;
137/454.5; 137/505.35
[58] Field of Search .............. 251/44, 30.02;
137/454.5, 505.35

[56] References Cited

U.S. PATENT DOCUMENTS

| | | | |
|---|---|---|---|
| 2,439,523 | 4/1948 | Miller et al. | 251/30.02 |
| 2,635,636 | 4/1953 | Carson, Jr. | 251/44 |
| 2,693,823 | 11/1954 | Sogge | 251/30.02 |
| 3,433,262 | 3/1969 | Ray | 251/30.02 |
| 3,451,431 | 6/1969 | Royer | 137/505.35 |
| 3,474,811 | 10/1969 | Blair | 251/44 |
| 4,305,566 | 12/1981 | Grawunde | 251/44 |
| 4,699,351 | 10/1987 | Wells | 251/44 |

Primary Examiner—A. Michael Chambers
Attorney, Agent, or Firm—Cushman, Darby & Cushman

[57] ABSTRACT

Valve for pressurized media which includes a valve housing provided with inlet and outlet and a movable main valve plug for infinitely variably controlling the pressurized medium flow through the valve with the aid of a pilot flow originating from the pressurized medium flow and passing through a variable throttling means situated in the main valve plug. For obtaining a compact valve unit, the pilot flow control valve (18) is arranged in a member arranged as a lid on a cartridge sleeve including the valve housing, for opening or closing a pilot flow duct (15) in the cartridge in response to a control signal, a pressure compensation means (54) being arranged in the duct (15) after the throttling means (26) in the main valve plug (5) but before the pilot flow control valve (18), this means (54) being under the action of the pressure in the pilot flow duct (15) prevailing after the throttling means (26) and of a piston sensing the pressure in the valve inlet and/or outlet for throttling or interrupting the pilot flow before the pilot flow control valve (18) in response to pressure changes in the inlet or outlet.

9 Claims, 3 Drawing Sheets

VALVE FOR PRESSURIZED MEDIA

BACKGROUND OF THE INVENTION

The present invention relates to a valve for pressurized media configured as a cartridge which can be screwed into a valve block for connecting the valve to a pressure medium duct in the valve block, the valve including a valve housing provided with inlet and outlet and formed as a sleeve-like part of the cartridge such as to be screwable into the valve block, there being a main valve plug movably arranged in the housing for infinitely variable control of a pressurized medium flow through the valve in the pressurized medium duct with the aid of a pilot flow originating from the pressurized medium flow governed by a controllable pilot flow valve, the pilot flow passing through a variable pilot flow throttling means situated in the main valve plug.

Valves of the kind mentioned above are already known, even in embodiments for placing in valve blocks to form multifunction valves. In these known embodiments, the pressurized medium valve itself is formed as a unit separated from its associated pilot flow control valve, which is also a separate unit and must thus be mounted separately in the valve block and be connected therein to the pressurized medium valve itself in a manner such that a pilot flow originating from the pressurized medium flow can be controlled by the pilot flow control valve. Any valve block used in this connection must therefore be made with pilot flow ducts from the variable pilot flow throttling means of the valve to the inlet of the pilot valve and from its outlet back to the pressurized medium valve after its outlet. The need of a plurality of such ducts results in complicated manufacture of the valve block and such manufacture cannot be standardized to any great extent, which particularly applies to complicated multifunction valves, e.g. directional valves, which require for their function at least four pressurized medium valves of the type described in the introduction, as well as associated pilot flow control valves and other functional valves which must be also arranged in the valve block and connected to some other appropriate valve for obtaining the intended function.

SUMMARY OF THE INVENTION

The object of the present invention is therefore to provide a pressurized medium valve of the kind described above, which is compact and formed as a cartridge which can be screwed into the valve block, the cartridge being a unit containing the pilot control valve and pressure compensation means as well as the pressurized medium valve itself.

BRIEF DESCRIPTION OF THE DRAWINGS

The invention will now be described in more detail with reference to the accompanying drawings wherein.

DETAILED DESCRIPTION

Figure 1:
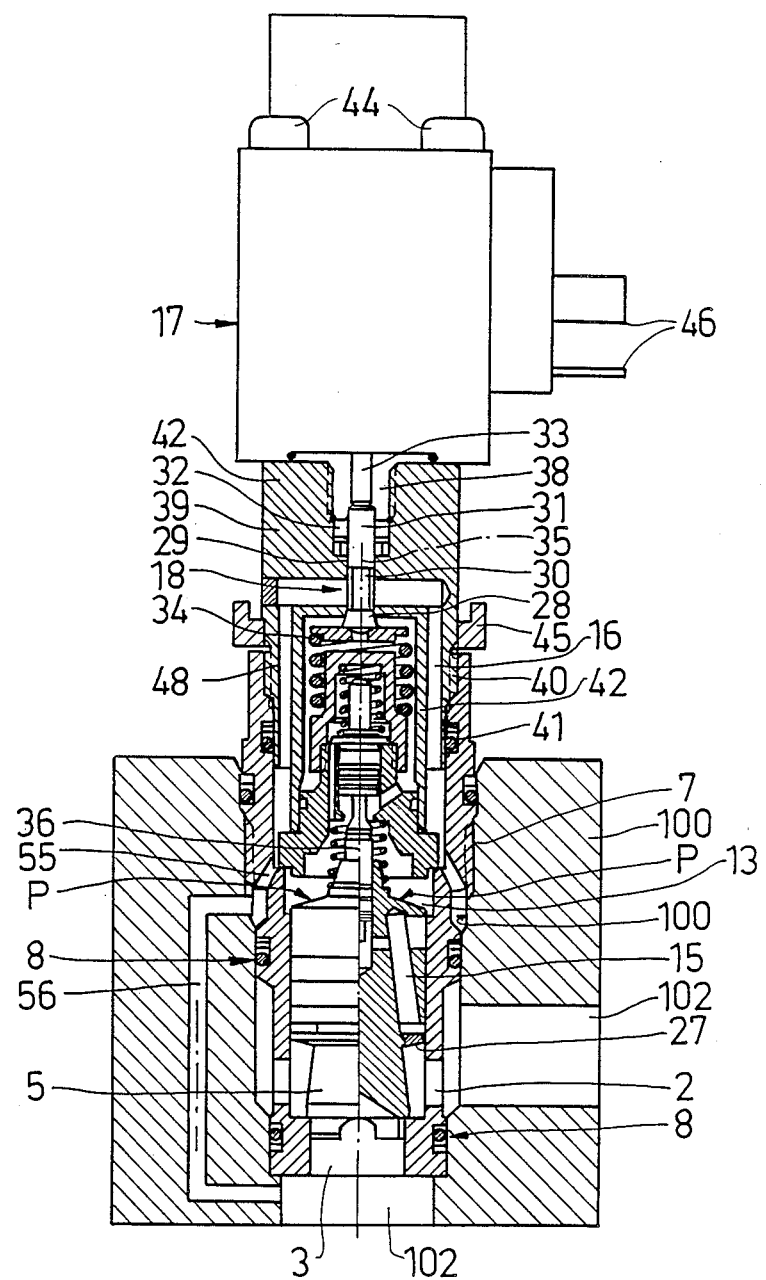
FIG. 1 is a section through a valve according to this invention arranged in its valve block.

The pressurized medium valve in accordance with this invention includes a valve housing 1 with an inlet 2 configured as one or more openings and an outlet 3, these leading respectively into and out from a valve chamber 4 accommodating a movably disposed valve plug 5 and situated inside the housing 1. In its closed position, this valve plug 5 is kept tightly engaging against a valve seat 6 surrounding the outlet 3. The housing 1 is exteriorly provided with a thread 7 for meshing with the thread in a connection hole 101 in a valve block 100 such as to connect the valve to the intended flow duct 102. In other words, the housing 1 functions as a cartridge which is rapidly and readily connected by quite simply screwing it in tightly into the intended connection hole in the valve block 100, and which has seals 8 on both sides of the inlet 2, as well as above the threaded portion 7 of the housing for sealing the housing 1 against the wall of the connection hole in a manner known per se. These seals 8 are each arranged in circumferential grooves 9 on the outside of the valve housing and each includes a sealing ring 10 and a support ring 11.

The main valve plug 5 has an end surface 12 which, in coaction with the seating surface 6 in the housing 1, closes off the valve outlet 3 and is kept in its closed position by a holding force P acting on an end surface of the plug, this surface facing away from the pressure side and situated in a space 13 formed in the housing 1 as a pilot flow chamber. The chamber 13 is connected to the inlet via a pilot flow duct 15 made in the valve plug 5, and to the outlet 3 and the pressurized medium flow the valve is to control via a pilot flow duct 16 in the valve after the pilot flow chamber 13. A pilot flow control valve 18 is arranged in the duct 16 from the pilot flow chamber 13 to the valve outlet 3, this valve 18 being actuable by an adjusting means 17, suitably in the form of a solenoid. With the aid of the control unit comprising the adjusting means 17 and pilot flow control valve 18, a pilot flow can be provided from the chamber 13 such as to control the main flow through the valve, quite independent of pressure, by the valve plug 5 being caused by the pilot flow to move from its closed position into any desired or required open position.

The pilot flow thus originates from the main flow before or after the valve inlet 2, and for linking off the pilot flow from the main flow to the pilot flow chamber 13 in the best possible manner, the duct !5 is formed as a groove or orifice 19 made in the plug 5 and functioning as a variable throttle means. Even in the closed position of the plug, this means has a certain communication with the pilot flow chamber 13 via a hole 20, as well as with the valve inlet 2. This communication consists of a gap 21 between a cylindrical portion 22 of the plug 5 and defined by an annular end surface 23 and a circumferential groove 24 made in the plug 5 such as to be in communication with the orifice 19. This cylindrical portion 22 of the plug has a diameter which shall be less than the diameter of the cylindrical valve chamber 4, in which the plug 5 is movably arranged in the housing 1, in order to form the mentioned gap 21. The axial length of this gap shall be several times as great as the radial width of the gap, such that the gap forms a restriction 25 at its inlet and results in its providing laminar flow, which causes an extra pressure drop. The pilot flow from the pressure side of the valve, i.e. from the inlet to the pilot flow chamber 13, will thus be less sensitive to the viscosity of the pressurized medium used, which means that the cross-sectional area of the pilot flow ducts will have less effect on the pilot flow, and the cross-sectional area of the pilot flow ducts can be made smaller than what is usually possible. It may also be said that the valve is temperature compensated in this way.

The valve 18 arranged in the duct 16 is infinitely controllable between its two end positions, namely between a closed position illustrated in FIG. 1 and an open position. In the closed position, a flow of pressurized fluid from the chamber 13 is thus prevented, and thus the occurrence of a pilot flow, accordingly there is obtained the same pressure in the chamber 13 as at the valve outlet 2, since the pressure is always higher on the inlet side of the valve compared with its outlet side 3. The pressure prevailing in the pilot flow chamber 13 give rise to the mentioned holding force P acting on the end surface 14 of the plug 5. Due to the area relationships, this holding force P is greater than the counteracting force responsive to the pressure in the inlet 2, and it thus keeps the plug 5 engaged against its seat 6 in a closed position as long as the valve 18 assumes its closed position and does not allow a pilot flow.

As soon as the valve 18 opens, a pilot flow occurs from the inlet 2 to the chamber 13 via the duct 15, which thus comprises the gap 21, groove 24, orifice 19 and hole 20, and due to the small width of the gap 21 in relation to its axial length, there is obtained a laminar flow in the gap 21, which results in the mentioned extra pressure drop, further to that which is obtained via the variable throttling means provided by the opening 26 of the hole 20 in the cylindrical surface of the valve body. With the aid of this extra pressure drop any pressure drop in the pilot flow duct 16 after the chamber 13 is also compensated.

Since the width of the gap 21 can be made very small, e.g. less than one-tenth of a millimeter, it also functions as a filter, thus preventing particles from being entrained in the pilot flow and depositing themselves on parts of the pilot flow control valve and the main valve which are sensitive to dirt. Increased functional and operational reliability are thus achieved for the present valve arrangement, and due to the circumferential grooves 21 and 24, there is only required a hole 20 opening out into the pilot flow chamber 13 and functioning as a variable throttle means, for obtaining such rotational symmetry that a completely satisfactory distribution of the pilot flow is obtained, independent of the valve plug position relative the valve housing 1. This in turn results in a lower requirement for accuracy in forming the valve housing and plug, thus achieving a simpler implementation and less costly manufacturing technique for the valve in accordance with this invention.

As a further example of a measure reducing manufacturing costs, it can be mentioned that the orifice 19, which is a part of the pilot flow duct 15 to the pilot flow chamber 13, can be bored either from the surface 14 to the groove 24 and then plugged at the surface 14 or from the other direction, as is the case in the embodiment illustrated on the drawings, boring then taking place through the portion 22, the bore then being plugged as illustrated at 27 in FIG. 1.

The pilot flow control valve 18 includes a valve plug 28 with a stem 29 having a narrow part 30 and a larger part 31 which is slidably mounted in a bush 32 such as to be in contact with an operating member 33 of the adjusting means, for activating the plug 28 to open the valve 18 against the bias of a heavy, strongly fixed compression spring 34, which acts as a return spring for closing the valve when so required. The operating member 33 of the adjusting means is a plunger and its centre line 35 is co-axial with the plug 28 and its stem 29 as well as with the centre line 36 of the main valve plug, as will be seen clearly from FIG. 1.

Figure 3:
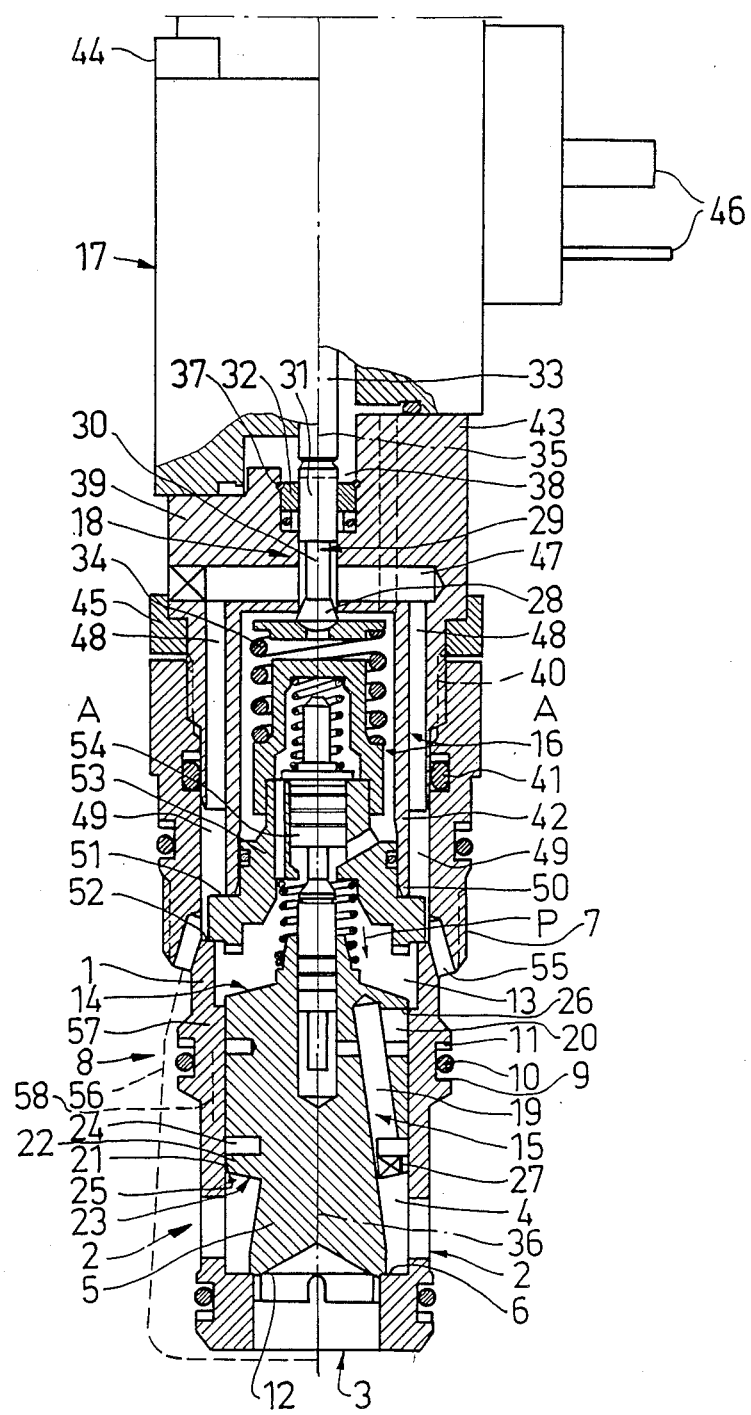

With the aid of a circlip 37, the bush 32 is retained in a hole 38 in an intermediate piece 39 which is threaded 40 into the valve housing 1 and sealed against it with the aid of a seal 41 of the same type as seals 8. This circular intermediate piece 39 includes an end portion 43, to which the adjusting means 17 is connected in a suitable manner, and which closes off one end of a sleeve-like portion 42 of the piece 39. To the left of the line 35 in FIG. 3, there is illustrated one method of attaching the means 17, and to the right of this line there is illustrated another method corresponding to the one used in FIG. 1. Which of these two methods should be used is completely dependent on the type of adjusting means it is intended to use. The means 17 is kept tight against the piece 39 with the aid of a number of screws 44 extending through the means but exterior to the circular piece 39, and they are screwed into a locking collar 45 fitted to the piece 39 and rotatable in relation thereto, and like the means 17 the exterior of the collar 45 is illustrated as being 4-cornered, e.g. quadratic. When the screws 44 are tightened, the adjusting means 17 is tightened against the intermediate piece 39, which is screwed into the valve housing 1. With this fastening arrangement of the adjusting means 17, a simple and rapid setting in relation to the valve housing 1 is obtained, since both the means 17 and this locking collar 45 are rotatable relative the valve housing as long as the screws 44 are not tightened. The means 17 can thus be rotated into any position suitable for connecting its contact means 46, irrespective of what position the valve housing 1 has assumed on being screwed into its valve block.

A hole 47 is bored through the end portion 43 of the intermediate piece and is plugged at one end. The sleeve-like portion 42 of the piece 39 is provided with an external shoulder. Holes 48 are bored in the shouldered portion such as to communicate with the hole 47 and also with an annular space 49 formed between the housing wall and the thin-walled end portion 50 of the sleeve portion 42. The pilot flow duct 16 includes the holes 47 and 48 as well as the space 49. In the embodiment of the present pressurized medium valve illustrated on the accompanying drawings, the end portion 50 engages against a circumferential shoulder 51 of a housing 53 formed interiorly in the valve housing 1 for a pressure compensation valve 54, the housing 53 being carried on an internally formed shoulder 52 on the valve housing 1. In embodiments of the present valve which lack pressure compensation, the end portion 50 may engage directly against the shoulder 52.

Figure 2:
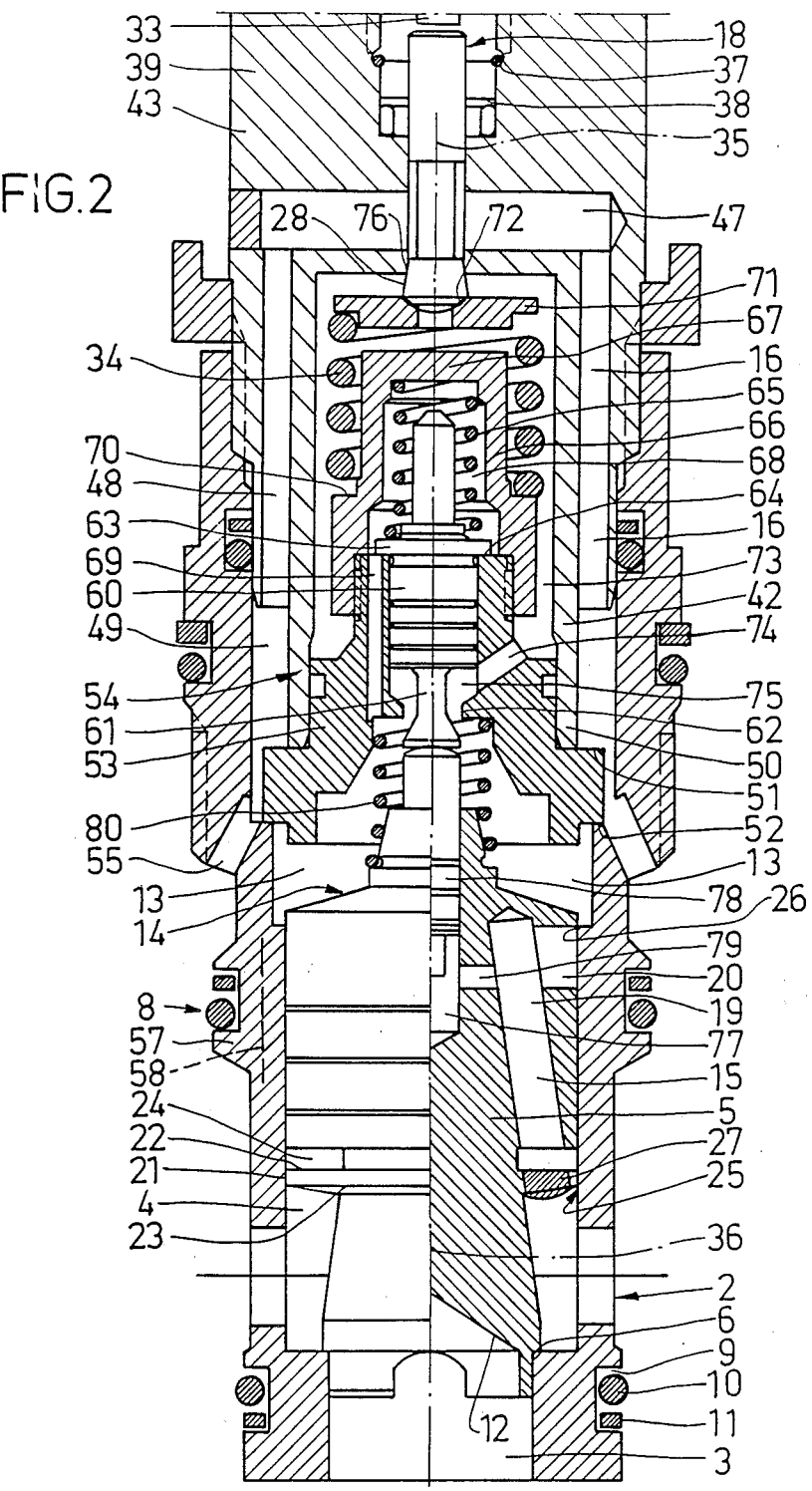
FIG. 2 illustrates the greater part of the actual valve in FIG. 1 to a larger scale and FIG. 3 illustrates, partly in section, the upper part of a valve in accordance with this invention and shows two alternative methods of attaching adjusting means associated with the valve.

The space 49 is in communication with one or more holes 55 made in the valve housing 1 and connected via orifices 56 in the valve block itself to the outlet 3 upstream of the main flow through the present valve, the holes 55 and orifices 56 also being included in the pilot flow duct 16 from the chamber 13. Instead of the holes 55 and orifices 56, it is also possible within the scope of the present invention to provide the necessary communication between the space 49 and the valve outlet 3 with the aid of ducts formed in the valve housing wall 57, as schematically illustrated in FIG. 2 with the aid of dashed lines 58.

The pressure compensation valve 54 includes a plunger 60 movably accommodated in the valve housing 53 and provided with a valve plug 61 for co-action with a valve seat 62 in the valve housing 53. In the open position of the valve 54 illustrated in FIGS. 1 and 2, it is kept open with the bias from a compression spring 65 acting on a collar 63 of the plunger 60 such as to engage the collar against an end surface 64 of the valve housing 53. The spring 65 is compressed between a bottom 67 of a cap 66 removably fastened to the valve housing 53, e.g. threaded thereon, and the collar 63. A space 68 is formed on the inside of the cap, and via an orifice 69 in the valve housing 53, this space is in communication with the pilot flow chamber 13 for obtaining the same pressure in the space 68 as there is in the space 13.

The cap 66 forming the space 68 is externally provided with a shoulder 70, against which the heavily compressed return spring 34 of the pilot valve engages at one end, with its other end engaging against a washer 71. On its side facing away from the spring 34, the washer 71 has a seat 72 shaped as a concave spherical segment, which is complementary to the end portion of the pilot valve plug 28, such as to balance the washer 71. The washer, cap 66, spring 34, plunger 60 and spring 65 are all concentrically arranged about the centre lines 35, 36.

An annular space 73 is formed between the cap 66 and the sleeve-like portion 42 of the intermediate piece 39, this space forming a part of the pilot flow duct 16, which also includes one or more orifices 74 between the space 73 and the cavity 75 for the plunger 60 included in the pressure compensation valve. As long as the latter is open, the pilot flow chamber 13 is thus in communication with the chamber 73, which is kept closed in this position by the plug 28 being kept by the spring 34 against its seat 76.

A damper piston 78 is displaceably accommodated in a central cavity 77 situated at the end of the main valve plug 5 facing towards the pilot flow chamber 13, the end of the piston facing inwards being in communication with the valve inlet 2 via an orifice 79, and is thus subject to the pressure prevailing in the inlet 2. Due to the pressure drop at the variable throttle means 26 in the pilot flow duct 15, the damper piston 78 is kept with its other end engaging against the valve plug 61 of the pressure compensation valve, this plug as well as the part of the damper piston in the pilot flow chamber 13 being under the action of the pressure, which is reduced in relation to the inlet pressure by the mentioned pressure drop, this reduced pressure also acting on the end of the damper piston in the space 68. This reduced pressure in the pilot flow chamber is a definite function of the inlet and outlet pressures due to the area relationship of the main valve plug 5. The area relationship of the latter is also determining for the area relationship between the damper piston 78 and the pressure compensation valve plunger 60, and it may be said that the compensation valve is thus cheated into sensing the inlet and outlet pressures for compensating any pressure variations.

On the drawings, a spring 80 is illustrated acting between the main valve plug and the pressure compensation valve housing, this spring only being arranged as a safety means for ensuring that the plug 5 is kept in engagement against its seat 6. This spring is thus not necessary and can be dispensed with if so desired.

The present invention is not restricted to what has been described above and illustrated on the drawings, and can be amended, modified and supplemented in many different ways within the scope of the inventive concept defined in the following claims.

I claim:

1. A valve for pressurized media, in the outer configuration of a cartridge which can be screwed into a valve block (100) for connecting the valve to a pressurized medium duct in the valve block, said valve including a valve housing formed as a sleeve-like portion of said cartridge, provided with inlet and outlet and screwable in the valve block, there being arranged in said housing a main valve plug which is infinitely variably displaceable for infinitely variable control of a pressurized medium flow through the valve in said pressurized medium duct with the aid of a pilot flow originating from the pressurized medium flow and controllable by a pilot flow control valve, said pilot flow passing through a variable pilot flow throttling means (26) situated in the main valve plug, characterised in that the pilot flow control valve (18) is arranged in an end piece (39) formed as a lid on said cartridge sleeve, and adapted for opening or closing a pilot flow duct (15, 16) inside the cartridge in response to a control signal, and in that after the pilot flow throttling means (26) in the main valve plug (5), but before the pilot flow control valve (18), there is arranged a pressure compensation means (54) in said pilot flow duct (15, 16), this means (54) being disposed movably in a cylinder and spring biased to an open position, the opposing ends of said pressure compensation means (54) being under the action of the pressure prevailing in the pilot flow duct after the variable pilot flow throttling means (26), and in addition being under the action of a piston (78), said piston sensing the pressure in the valve inlet and/or outlet and being arranged movably in the end portion of the main valve plug facing away from the valve outlet, for throttling or interrupting the pilot flow before the pilot flow control valve (18) in response to pressure alterations in the inlet or outlet.

2. The valve as claimed in claim 1, characterised in that for actuating the pilot flow control valve (18), there is arranged an adjusting means, fastened to the end piece (39) and having operating means (33) coacting with the pilot flow control valve (18) for transferring necessary control signals to said pilot flow control valve (18).

3. The valve as claimed in claim 2, characterised in that the pilot flow control valve (18), main valve plug (5), pressure compensation means (54) and the piston (78) sensing the pressure in the inlet and/or outlet are arranged concentrically in relation to a common centre line (35, 36).

4. The valve as claimed in claim 3, characterised in that the operating means (33) of the adjusting means is concentrically arranged in relation to said common centre line (35, 36).

5. The valve as claimed in claim 1, characterised in that the pressure compensation means (54) has a valve plug (61) adapted for co-action with a valve seat (62) surrounding the pilot flow duct (16) from a pilot flow chamber (13) for compenating for any arising pressure variations in response to the pressure in the inlet and/or outlet, which the piston (78) senses.

6. The valve as claimed in claim 1, characterised in that the pressure compensation means (54) include a plunger (60) movable in a valve housing (53) and carrying the valve plug (61) of the pressure compensation means, said plunger (60) having a collar (63) at its end facing away from the valve plug, this collar engaging against an end surface (64) of the pressure compensation means valve housing (53) for keeping said pressure compensation means in its open position with the aid of a spring (65).

7. The valve as claimed in claim 6, characterised in that the spring (65) of the pressure compensation means is compressed between the plunger collar (63) and a cap fastened to the valve housing (53) of the pressure compensation means and forming a space (68) which is in communication with the pilot flow chamber (13) via an orifice (69) in said valve housing (53) for obtaining the same pressure as in said chamber (13).

8. The valve as claimed in claim 7, characterised in that there is a sleeve (66) a space (73) between said sleeve (66) and the sleeve-like portion (42) of the cartridge, this space being a part of the pilot flow duct (16) from the pilot flow chamber (13) and also accommodating a seat (76) for the plug (28) of the pilot flow control valve, a spring (34) being arranged in said space (73) between the valve housing (53) of the pressure compensation means and a washer (71) engaging against the valve plug (28) of the pilot flow control valve for returning and keeping the plug of the pilot flow control valve in a closed position against the seat (76).

9. The valve as claimed in 2, characterised by the adjusting means (17) being clamped to the end piece (39) of the cartridge with the aid of screws (44) which are screwable into a locking collar (45), which is rotatable relative the end piece.

* * * * *